US010850983B2

(12) United States Patent
Li et al.

(10) Patent No.: US 10,850,983 B2
(45) Date of Patent: *Dec. 1, 2020

(54) THREE-DIMENSIONAL HIERARCHICAL POROUS CARBON FOAMS FOR SUPERCAPACITORS

(71) Applicant: The Regents of the University of California, Oakland, CA (US)

(72) Inventors: Yat Li, Fremont, CA (US); Feng Zhang, Yancheng (CN); Tianyu Liu, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,997

(22) Filed: Dec. 4, 2019

(65) Prior Publication Data
US 2020/0102220 A1    Apr. 2, 2020

Related U.S. Application Data

(63) Continuation of application No. 16/082,329, filed as application No. PCT/US2017/022491 on Mar. 15, 2017, now Pat. No. 10,526,203.
(Continued)

(51) Int. Cl.
C01B 32/05 (2017.01)
H01G 11/70 (2013.01)
(Continued)

(52) U.S. Cl.
CPC .............. *C01B 32/05* (2017.08); *C01B 32/00* (2017.08); *H01G 11/26* (2013.01); *H01G 11/44* (2013.01); *H01G 11/70* (2013.01); *C01P 2004/03* (2013.01); *C01P 2004/30* (2013.01); *C01P 2006/12* (2013.01); *C01P 2006/16* (2013.01); *H01G 11/34* (2013.01)

(58) Field of Classification Search
None
See application file for complete search history.

(56) References Cited

PUBLICATIONS

Thompson et al.; Journal of Engineering for Gas Turbines and Power; vol. 129; Apr. 2007.*

* cited by examiner

*Primary Examiner* — Guinever S Gregorio
(74) *Attorney, Agent, or Firm* — Lumen Patent Firm

(57) ABSTRACT

A method of fabricating porous carbon foam includes mixing equal masses of $SiO_2$ particle dispersion with a chitosan solution, dropwise adding a glutaraldehyde aqueous solution into the mixture and solidifying it in air forming a room temperature hydrogel, lyophilizing the hydrogel to form a sponge-like $SiO_2$-embedded aerogel, carbonizing in a furnace the aerogel to form a $SiO_2$-embedded carbon foam, soaking the embedded carbon foam in NaOH to dissolve the $SiO_2$ particles to form a carbon foam having carbon sheets with sub-micron cavities, immersing the carbon sheets in de-ionized water to remove any NaOH residuals followed by drying, placing the carbon foam in KOH solution followed by drying, annealing in nitrogen atmosphere the dried carbon foam to synthesize a carbon foam with a multi-dimensional porous system, immersing the synthesized carbon foam in de-ionized water to prevent self-burning in air, and rinsing the carbon foam in HCl and water, then oven drying.

7 Claims, 5 Drawing Sheets

Related U.S. Application Data

(60) Provisional application No. 62/309,184, filed on Mar. 16, 2016.

(51) Int. Cl.
*C01B 32/00* (2017.01)
*H01G 11/44* (2013.01)
*H01G 11/26* (2013.01)
*H01G 11/34* (2013.01)

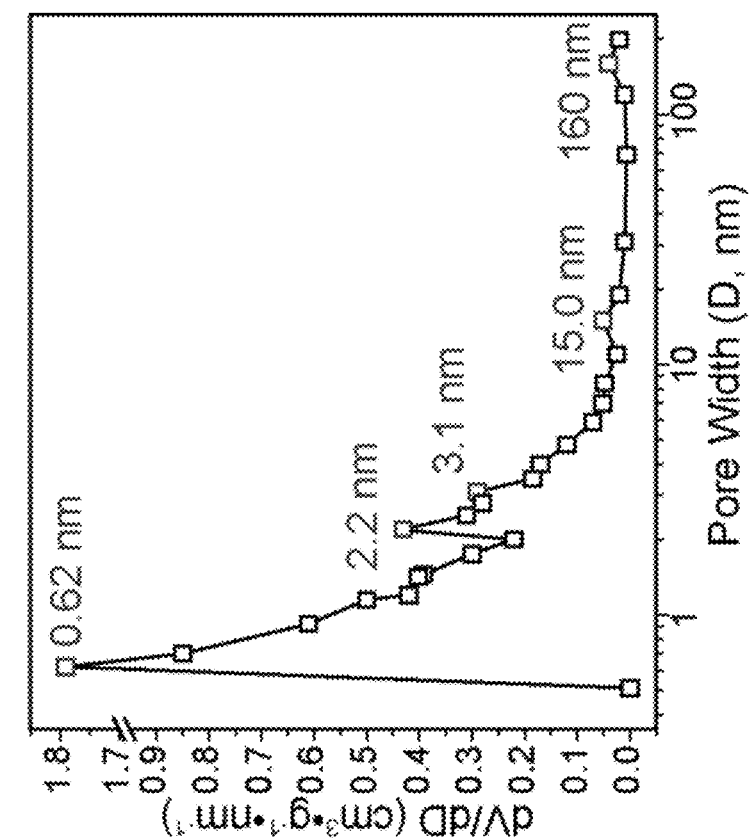
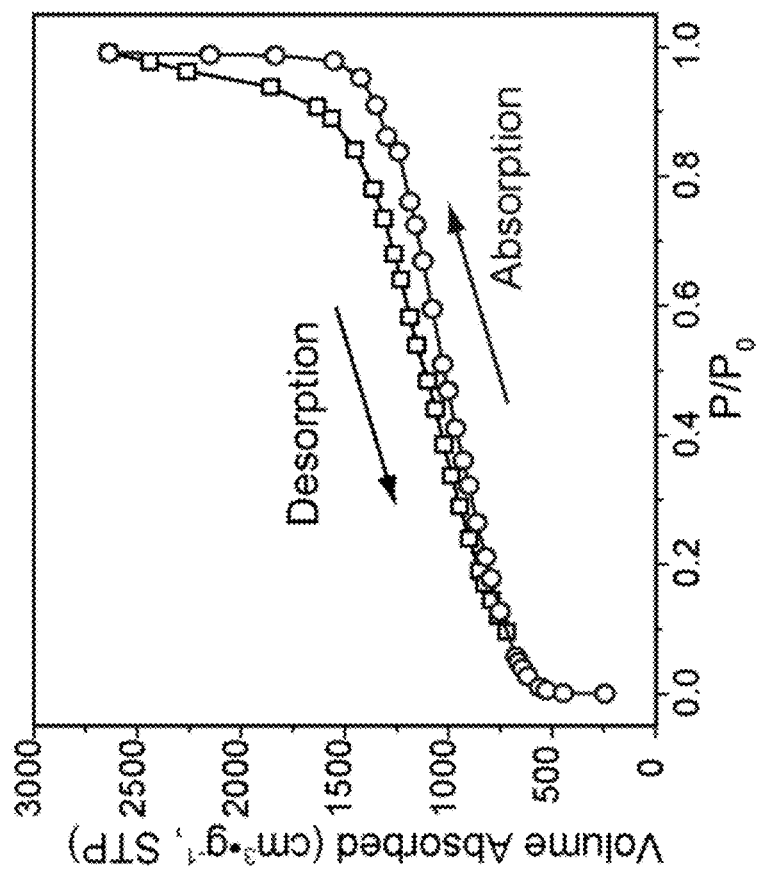
FIG. 4B
FIG. 4A

THREE-DIMENSIONAL HIERARCHICAL POROUS CARBON FOAMS FOR SUPERCAPACITORS

CROSS-REFERENCE TO RELATED APPLICATIONS

This application is a continuation of U.S. patent application Ser. No. 16/082,329 filed Sep. 5, 2018, which is incorporated herein by reference. U.S. patent application Ser. No. 16/082,329 is a 371 of PCT application PCT/US2017/022491 filed on Mar. 15, 2017. PCT application PCT/US2017/022491 claims the benefit of U.S. Provisional application 62/309,184 filed on Mar. 16, 2016.

FIELD OF THE INVENTION

The present invention relates generally to chitosan derived carbon material. More particularly, the invention relates to a combination of template method and chemical activation to synthesize chitosan derived carbon foams with hierarchical porous structure and surface area of nearly 3000 $m^2/g$.

BACKGROUND OF THE INVENTION

Enhancing charge storage capacity at ultrafast charging and discharging rates for electrical storage is an important topic of contemporary scientific research. High-capacity and low-cost energy storage systems are needed for technologies that include consumer electronics, and supercapacitors. The shortcomings of lithium-ion storage technologies include high costs and limited power density that restrict their applications.

What is needed is a three-dimensional hierarchical porous carbon foam that can maintain substantially higher capacitance at ultrafast charge and discharge rates than other conventional carbon materials that are used as supercapacitor electrodes.

SUMMARY OF THE INVENTION

To address the needs in the art, a method of fabricating chitosan-derived porous carbon foam is provided that includes mixing a $SiO_2$ particle dispersion with a chitosan solution, where the mass of the $SiO_2$ particle dispersion is equal to the mass of the chitosan polymer, dropwise adding a glutaraldehyde aqueous solution into the mixture of $SiO_2$ particle dispersion and chitosan, solidifying in air, the glutaraldehyde aqueous solution and the mixture of $SiO_2$ particle dispersion and chitosan forming a room temperature hydrogel, lyophilizing the room temperature hydrogel to form a sponge-like $SiO_2$-embedded aerogel, carbonizing in a furnace the sponge-like $SiO_2$-embedded aerogel to form a $SiO_2$-embedded carbon foam, soaking the $SiO_2$-embedded carbon foam in sodium hydroxide (NaOH) to dissolve the $SiO_2$ particles to form a carbon foam having carbon sheets with sub-micron cavities, immersing the carbon foam having carbon sheets with sub-micron cavities in de-ionized water to remove any NaOH residuals followed by drying, placing the carbon foam in potassium hydroxide (KOH) solution followed by drying, annealing in nitrogen atmosphere the dried carbon foam to synthesize a carbon foam with a multi-dimensional porous system, immersing the annealed carbon foam with a multi-dimensional porous system in de-ionized water to prevent self-burning in air, and rinsing the carbon foam with a multi-dimensional porous system in hydrochloric acid (HCl) and water, then oven drying.

According to one aspect of the invention, the carbon foam with a multi-dimensional and hierarchical porous system has pore sizes in a range from sub-nm to tens of μm.

In a further aspect of the invention, the carbon foam with a multi-dimensional porous system has a Brunauer-Emmett-Teller surface area of 2905 $m^2$ $g^{-1}$.

According to one aspect of the invention, the synthesis process of the carbon foam with a multi-dimensional porous system does not involve toxic hydrocarbons.

In yet another aspect of the invention, the $SiO_2$ particle dispersion is formed using tetraethyl orthosilicate.

BRIEF DESCRIPTION OF THE DRAWINGS

FIGS. 4A-4B show pore size characterizations, where (4A) shows the nitrogen adsorption-desorption isotherm collected for CF-MP at the liquid nitrogen temperature (77 K), and (4B) shows the pore size distribution curve derived from Barrett-Joyner-Halenda theory using the isotherm shown in (4A), where the curve shows the presence of micro-pores and meso-pores in CF-MP, according to one embodiment of the invention.

DETAILED DESCRIPTION

Figures 1A, 1B:
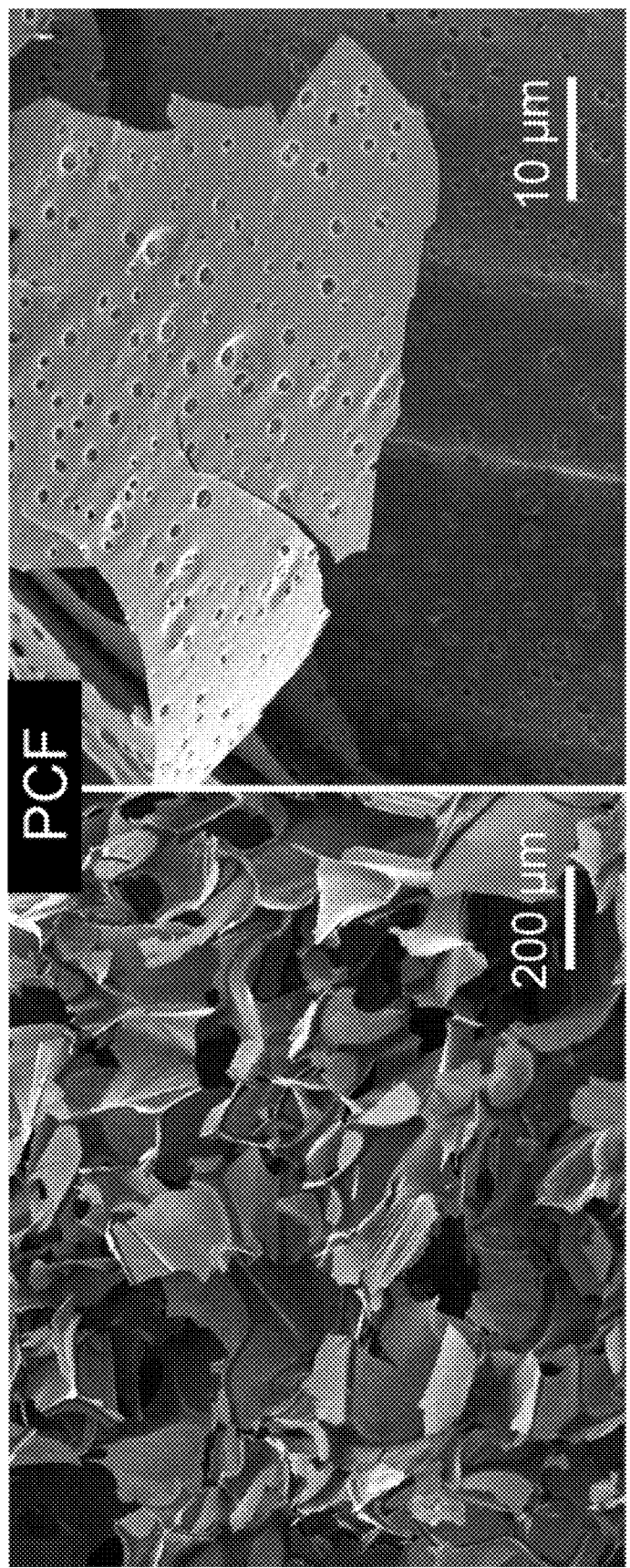
FIGS. 1A-1B show SEM images of the morphology of the as-prepared PCF, where (1A) shows the three-dimensional interconnected network of carbon sheets and (1B) shows a single piece of porous carbon sheet, with macro-pores of diameter around 2 μm uniformly dispersed on the carbon sheet, according to one embodiment of the invention.

The current invention provides a method to synthesize three-dimensional hierarchical porous carbon foam (PFC) with inherent nitrogen-doping and extremely large surface area (2905 $m^2$ $g^{-1}$, measured by Bruanauer-Emmett-Teller test). The hierarchical porous carbon foam electrode delivers an outstanding specific capacitance of ~240 F $g^{-1}$ at an ultrahigh current density of 500 A $g^{-1}$.

In one embodiment, a combination of using a template method and a chemical modification to increase the surface area of chitosan derived carbon material is provided. The as-prepared carbon material achieves a remarkable surface area of ~3000 $m^2$ $g^{-1}$, which is the highest value reported for chitosan derived carbon materials.

In another aspect of the invention, the carbon structure is implemented as an electrode for a supercapacitor device. According to one embodiment, the invention achieves outstanding specific capacitances at ultrafast charging rates (e.g., ~240 F/g at ultrahigh current density of 500 A/g). These values are significantly better than the values obtained from any other chitosan derived carbon electrodes under same measurement conditions. These values are also better than the values of most (if not all) of the carbon materials measured at ultrahigh charging rates.

The invention is capable of providing a high capacitance at ultrafast charging and discharging rates. The three-dimensional hierarchical porous foams can maintain substantially higher capacitance at ultrafast charge and discharge rates than other conventional carbon materials that are used as supercapacitor electrodes.

The current invention uses chitosan as the major starting material. Chitosan is the second most abundant natural bio-polymer that is readily available in shrimp shells. The availability and sustainability of chitosan can greatly reduce the material cost of supercapacitors.

In general, a method of fabricating chitosan-derived porous carbon foam is provided that includes mixing a $SiO_2$ particle dispersion with a chitosan solution, where the mass of the $SiO_2$ particle dispersion is equal to the mass of the chitosan polymer, dropwise adding a glutaraldehyde aqueous solution into the mixture of $SiO_2$ particle dispersion and chitosan, solidifying in air, the glutaraldehyde aqueous solution and the mixture of $SiO_2$ particle dispersion and chitosan forming a room temperature hydrogel, lyophilizing the room temperature hydrogel to form a sponge-like $SiO_2$-embedded aerogel, carbonizing in a furnace the sponge-like $SiO_2$-embedded aerogel to form a $SiO_2$-embedded carbon foam, soaking the $SiO_2$-embedded carbon foam in sodium hydroxide (NaOH) to dissolve the $SiO_2$ particles to form a carbon foam having carbon sheets with sub-micron cavities, immersing the carbon foam having carbon sheets with sub-micron cavities in de-ionized water to remove any NaOH residuals followed by drying, placing the carbon foam in potassium hydroxide (KOH) solution followed by drying, annealing in nitrogen atmosphere the dried carbon foam to synthesize a carbon foam with a multi-dimensional porous system, immersing the annealed carbon foam with a multi-dimensional porous system in de-ionized water to prevent self-burning in air, and rinsing the carbon foam with a multi-dimensional porous system in hydrochloric acid (HCl) and water, then oven drying.

In one exemplary experiment, chemical constituents were used that include chitosan (M.W. 100,000~300,000), acetic acid (glacial, 99.9 wt %), potassium carbonate ($K_2CO_3$), and glutaraldehyde aqueous solution (50 wt %). All chemicals were used without further purification.

According to one exemplary fabrication process, 1 mL of 10 wt % $K_2CO_3$ aqueous solution was slowly added into 20 mL of 1 wt % chitosan solution (with 1 wt % acetic acid as solvent) under vigorous stirring. Then, 240 µL of 25 wt % glutaraldehyde aqueous solution was added dropwise into the solution. After adding glutaraldehyde solution, the mixed solution was immediately transferred into a plastic container (e.g., a petri dish). The solution slowly solidified in the air and formed the hydrogel. The as-formed hydrogel was exposed in air for 1 day to age and then was frozen in a freezer. The frozen $K_2CO_3$-embedded chitosan hydrogel was freeze-dried for 48 h to form the chitosan aerogel. Pyrolysis of the aerogel was carried out in a home-built tube furnace in nitrogen atmosphere at 800° C. for 2 hours to obtain PCF. The PCF was washed with 0.1 M hydrochloric acid solution and de-ionized water to remove any soluble residuals.

The scanning electron microscopy (SEM) images or FIGS. 1A-1B reveal the PCF possesses a three-dimensional porous structure. Macro-pores of diameter around 2 µm are uniformly dispersed on each carbon sheet.

Figure 2B:
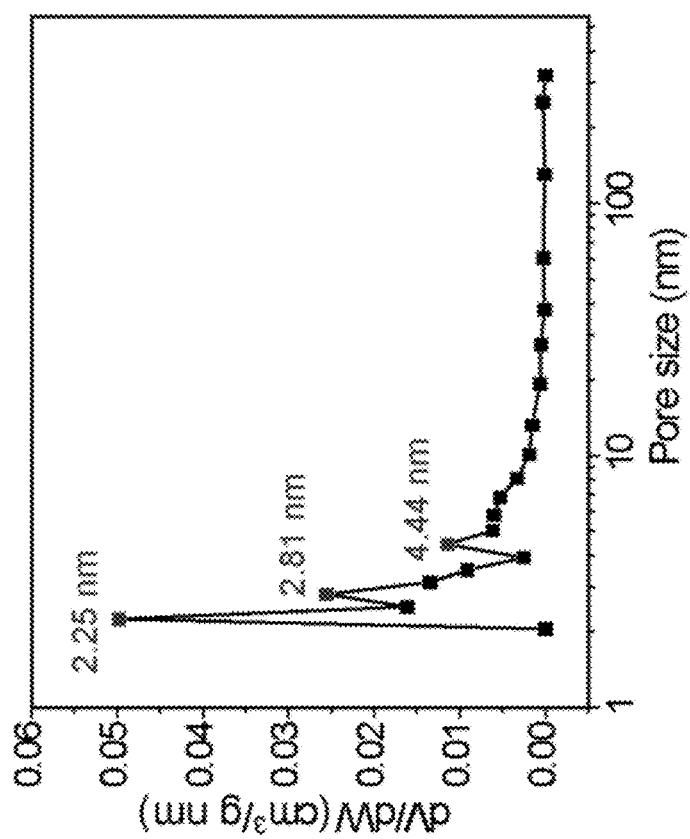
FIGS. 2A-2B shown pore size characterizations, where (2A) shows the nitrogen adsorption-desorption isotherm collected for PCF at the liquid nitrogen temperature (77 K), and (2B) show the pore size distribution curve derived from Barrett-Joyner-Halenda theory using the isotherm shown in (2A), according to one embodiment of the invention.
Figure 2A:
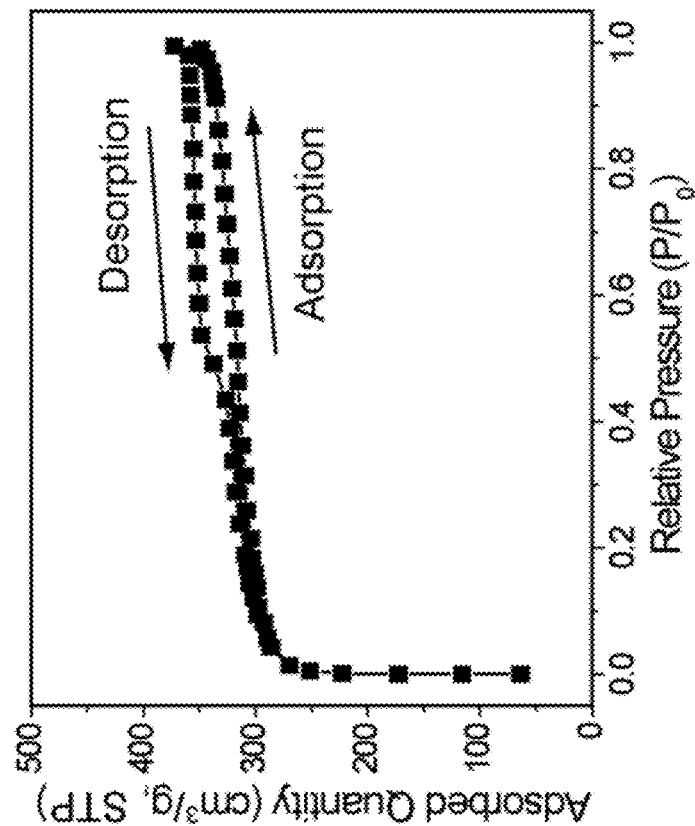

The porous structure of PCF was characterized by a nitrogen adsorption and desorption experiment. As shown in FIG. 2A, PCF exhibits combined characteristics of type I and type IV isotherms. The steep increase of adsorbed nitrogen volume at low relative pressure ($P/P_0<0.1$) indicates the dominance of micro-pores in PCF. The hysteresis observed at $P/P_0>0.4$ proves the existence of meso-pores (FIG. 2B). The surface area and pore volumes of PCF are summarized in Table 1. It clearly shows the presence of micro-pores and meso-pores in PCF.

TABLE 1

Textural properties of PCF

| Sample | BET Surface Area, S (m²/g) | Total Pore Volume, $V_{total}$ (cm³/g) | Micropore Volume, $V_{micro}$ (cm³/g) | Meso-pore Volume, $V_{meso}$ (cm³/g) | Ratio of $V_{micro}$ to $V_{meso}$ |
|---|---|---|---|---|---|
| PCF | 1013.0 | 0.576 | 0.461 | 0.154 | 2.994 |

Turning now to the preparation of hierarchical porous carbon foams from glutaraldehyde-crosslinked chitosan aerogel with silica spheres, in another exemplary experiment, chemical constituents were used that include chitosan (M.W. 100,000~300,000), acetic acid (glacial, 99.9%), tetraethyl orthosilicate (TEOS), potassium hydroxide (KOH), hydrochloric acid (HCl), absolute ethanol, and glutaraldehyde aqueous solution (50 vol %). All chemicals were used without further purifications.

In this exemplary fabrication process, $SiO_2$ spheres were prepared using the modified Stober method. First, 100 mL of absolute ethanol, 15 mL of de-ionized water, and 5 mL of ammonia aqueous solution (25 wt %) were mixed in a 250-mL round-bottom flask. The mixture was stirred at 500 rpm and heated to 40° C. in a water bath. Second, 6.0 g of TEOS was quickly added into the mixture and kept the temperature at 40° C. for 6 h to let TEOS react with ammonia. After the reaction, the solution turned from clear to white. The white precipitation ($SiO_2$ spheres) was collected by centrifugation and rinsed with denatured alcohol (95 vol %) three times followed by de-ionized water until the pH value reached 7. The cleaned precipitation was re-dispersed in 20 mL de-ionized water prior to use.

In the preparation of silica embedded carbon foam (CF-$SiO_2$), $SiO_2$ particle dispersion was slowly added into 18 g of 1.2 wt % chitosan solution (with 1 wt % acetic acid as solvent) under vigorous magnetic stirring. The mass of added $SiO_2$ particles was equal to the mass of chitosan powder. Then, 216 µL of 50 wt % glutaraldehyde aqueous solution was added into the mixture dropwise. Subsequently, the mixture was poured into a container, e.g., a petri dish. The solution was gradually solidified in air and formed hydrogel under room temperature. The as-formed hydrogel was aged at room temperature for one day and then lyophilized to obtain the spongy $SiO_2$-embedded aerogel. This aerogel was then pyrolyzed in a tube furnace at 800° C. for 2 hours in nitrogen atmosphere to obtain the CF-$SiO_2$.

Turning now to the preparation of carbon foam with templated walls (CF-TW), a piece of CF-$SiO_2$ was soaked into 2 M sodium hydroxide (NaOH) aqueous solution at 90° C. for 10 hours to completely dissolve the $SiO_2$ particles. The obtained CF-TW was immersed in de-ionized water overnight to remove any NaOH residuals followed by drying in an electric oven at 80° C. for 2 h.

For the preparation of carbon foam with multi-dimensional porous system (CF-MP), the aforementioned CF-TW was further reacted with potassium hydroxide (KOH) to create micro-pores. First, the CF-TW was put in 1.0 M KOH solution for 8 h and then dried in an electric oven at 80° C. for 2 hours. Second, the dried carbon foam was annealed in a tube furnace at 800° C. in nitrogen atmosphere for 1 hour to synthesize the CF-MP. After the annealing, the sample was quickly slid into a beaker of de-ionized water to prevent self-burning in the air. Finally, the obtained CF-MP was rinsed by 0.5 M HCl and ample amount of water to pH~7 and dried in the oven at 80° C. for 2 h.

Figure 3B:
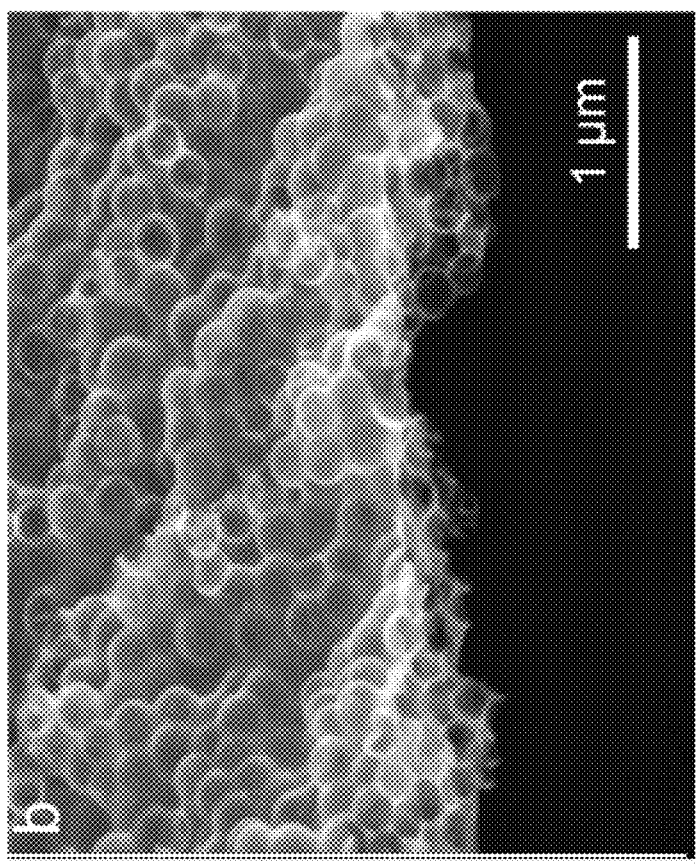
FIGS. 3A-3B show the morphology of as-prepared carbon foams with multiscale pores (CF-MP), where (3A) show a three-dimensional interconnected network of carbon sheets and (3B) shows a single piece of porous carbon sheet, where uniformly distributed macro-pores with diameters around 200 nm were created after removal of silica nanospheres, according to one embodiment of the invention.
Figure 3A:
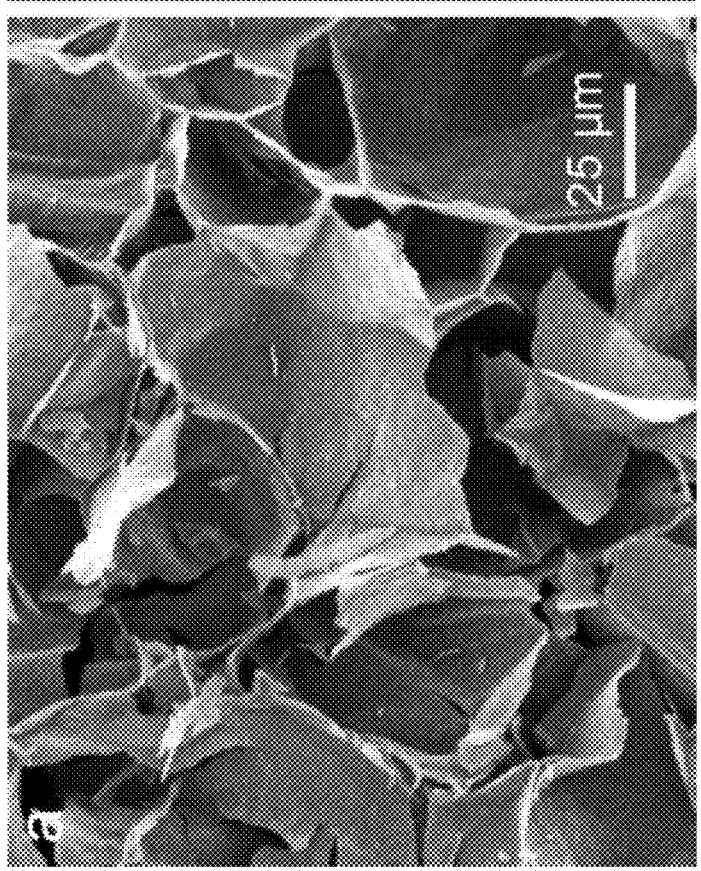

For the characterization of the CF-MP, FIGS. 3A-3B show the morphology of as-prepared CF-MP. In FIG. 3A, the three-dimensional interconnected network of carbon sheets is shown, and in FIG. 3B, a single piece of porous carbon sheet is shown. Here, uniformly distributed pores with diameters around 200 nm were created after removal of silica nanospheres.

FIG. 4A shows the nitrogen adsorption-desorption isotherms of CF-MP. CF-MP exhibits combined characteristics of type I and type IV isotherms with steep increase of absorbed $N_2$ at low relative pressure ($P/P_0<0.1$) and slightly steep adsorption at $P/P_0>0.8$, indicating the co-existence of micro-, meso-, and macropores. The textural properties of CF-MP are summarized in Table 2. The CF-MP has ultra-high surface area of 2905.6 $m^2/g$, much higher than conventional materials.

Figure 5:
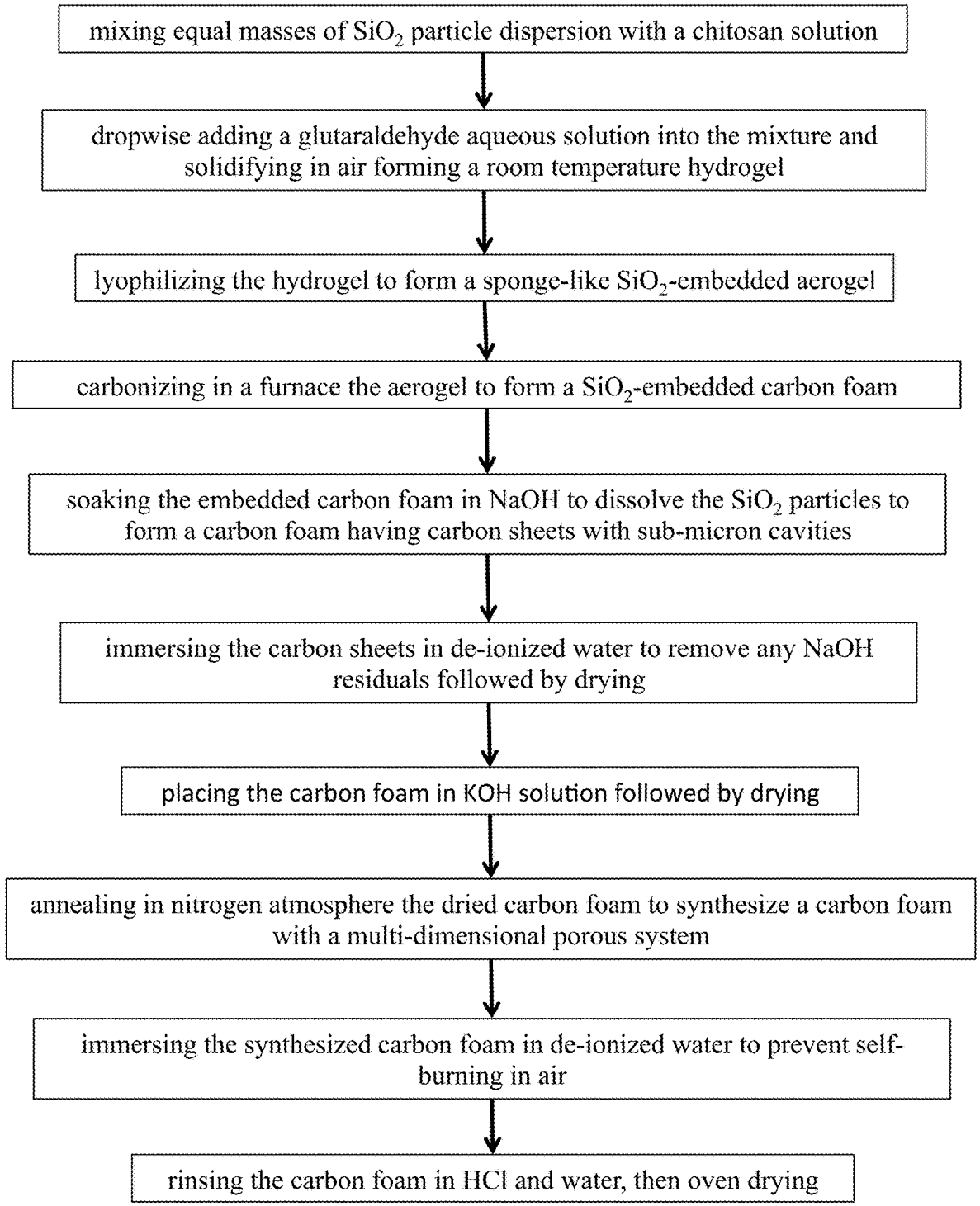
FIG. 5 shows a flow diagram of the fabrication method for the ultrahigh surface area CF-MP, according to one embodiment of the invention.

FIG. 5 shows a flow diagram of the fabrication method for the ultrahigh surface area CF-MP, according to one embodiment of the invention.

TABLE 2

Textural properties of CF-MP

| Sample | BET surface area, S ($m^2 \cdot g$) | Total pore volume, $V_{total}^a$ ($cm^3 \cdot g$) | Micropore volume, $V_{micro}^b$ ($cm^3 \cdot g$) | $V_{non\text{-}micro}^c$ ($cm^3 \cdot g$) | Ratio of $V_{micro}$ to $V_{non\text{-}micro}$ |
|---|---|---|---|---|---|
| CF-MP | 2905.6 | 4.08 | 0.930 | 3.407 | 0.273 |

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, developing 3D printed hierarchical porous carbon foam electrodes for supercapacitors and other devices, including batteries, catalysts and fuel cells.

What is claimed:

1. A method of fabricating three-dimensional porous carbon foam for supercapacitors, batteries, catalysts or fuel cells, wherein the method comprising;
    a) mixing a $SiO_2$ particle dispersion with a chitosan solution;
    b) adding a glutaraldehyde aqueous solution into the mixture of $SiO_2$ particle dispersion and chitosan and solidifying in air to form a hydrogel;
    c) lyophilizing the hydrogel;
    d) carbonizing the hydrogel; and
    e) dissolving $SiO_2$ from the hydrogel to form the three-dimensional porous carbon foam.

2. The method as set forth in claim 1, wherein three-dimensional porous carbon foam has pore sizes in a range from sub-nm to tens of μm.

3. The method as set forth in claim 1, wherein the three-dimensional porous carbon foam has a Brunauer-Emmett-Teller surface area of 2905 $m^2\ g^{-1}$.

4. The method as set forth in claim 1, wherein the $SiO_2$ particle dispersion is formed using tetraethyl orthosilicate.

5. The method as set forth in claim 1, wherein the mass of the $SiO_2$ particle dispersion is equal to the mass of the chitosan polymer.

6. The method as set forth in claim 1, wherein the dissolving $SiO_2$ from the hydrogel is dissolved in a basic solution.

7. A three-dimensional porous carbon foam precursor, comprising;
    a) a mixture of $SiO_2$ particles and chitosan; and
    b) glutaraldehyde solidified with the mixture of $SiO_2$ particles and chitosan.

* * * * *